United States Patent
Pomogaev et al.

(10) Patent No.: US 6,429,770 B1
(45) Date of Patent: Aug. 6, 2002

(54) APPARATUS FOR COMMUNICATING MULTI-LINGUAL MESSAGES AND METHOD THEREFOR

(75) Inventors: Denis Y. Pomogaev, Boca Raton; Jeffrey E. Malinsky, Boynton Beach; Michael A. Criger, Lighthouse Point; Jeffrey C. Henley, Delray Beach, all of FL (US)

(73) Assignee: Motorola, Inc., Schaumburg, IL (US)

( * ) Notice: Subject to any disclaimer, the term of this patent is extended or adjusted under 35 U.S.C. 154(b) by 139 days.

(21) Appl. No.: 09/671,812

(22) Filed: Sep. 21, 2000

Related U.S. Application Data

(63) Continuation of application No. 08/931,958, filed on Sep. 17, 1997, now abandoned.
(60) Provisional application No. 60/056,016, filed on Aug. 18, 1997.

(51) Int. Cl.$^7$ .................................................. G08B 5/22
(52) U.S. Cl. ...................................... 340/7.2; 340/7.51
(58) Field of Search .................................. 340/7.2, 7.21, 340/31, 7.27, 7.28, 7.51, 52, 7.53, 7.55, 7.56, 311.1, 7.45

(56) References Cited

U.S. PATENT DOCUMENTS 5,107,259 A * 4/1992 Weitzen et al. ............ 340/7.56
5,889,473 A * 3/1999 Wicks ....................... 340/7.21

* cited by examiner

*Primary Examiner*—Michael Horabik
*Assistant Examiner*—William Bangachon
(74) *Attorney, Agent, or Firm*—Randi L. Dulaney

(57) ABSTRACT

A communication system (100) includes a radio transmitter (116) and a SCR (selective call receiver) (122). The radio transmitter includes a transmitting device (404), and a controller (408) adapted to receive a message from a source, select at least one address identifying the SCR and identifying a language origin of the message, and cause the transmitting device to transmit the at least one address and the message to the SCR. The SCR includes a receiving device (504), a presentation device (518), and a processor (508) adapted to cause the receiving device to receive the at least one address and the message transmitted by the radio transmitter, determine the language origin of the message based on the at least one address, process the message into presentable data corresponding to the language origin, and cause the presentation device to present the message according to the presentable data.

14 Claims, 3 Drawing Sheets

200

300

US 6,429,770 B1

APPARATUS FOR COMMUNICATING MULTI-LINGUAL MESSAGES AND METHOD THEREFOR

RELATED APPLICATION

This is a continuation of U.S. patent application Ser. No. 08/931,958, filed Sep. 17, 1997, now abandoned, and also claims the benefit of the prior filing date of now abandoned provisional application No. 60/056,016, entitled "APPARATUS FOR COMMUNICATING MULTI-LINGUAL MESSAGES AND METHOD THEREFOR" filed Aug. 18, 1997, by the identical inventors as the inventors of the present application.

FIELD OF THE INVENTION

This invention relates in general to radio communication systems, and particularly to an apparatus for communicating multi-lingual messages and method therefor.

BACKGROUND OF THE INVENTION

Presently, service providers provide information services to consumers carrying a communication unit such as a selective call receiver or transceiver by way of a radio communication system that communicates radio messages to the communication unit. These services can include, but are not limited to, news services, stock exchange services, and weather services. Additionally, service providers provide general messages services in which an interested party can remotely send customized messages to a consumer carrying a communication unit. These custom messages are often transmitted as alphanumeric messages which inform the recipient consumer of the caller's intent.

Messages generated by either information services or custom message services are generally transmitted in the native language of the country in which such services originate. Taking Europe, for example, a message originating from Great Britain will be transmitted in the English language while a message originating from France will be transmitted in the French language. As one might expect, communication units are generally programmed at each country to decode the language of a corresponding country.

Presently, the European Radio Messaging (ERMES) protocol provides a method for communication units to decode more than one language without requiring reprogramming of the communication unit on a country-by-country basis. Specifically, the ERMES protocol includes a character set identifier, which is appended to the message transmitted by a radio communication system. This field identifies the language of origin of the message transmitted. When a message is intercepted by a communication unit, the communication unit decodes the character set identifier prior to processing the message for display to a user of the communication unit. To process the message, the character set identifier is used by the communication unit to index through its internal memory (generally, non-volatile) to select an appropriate bitmap for displaying the message.

Although this method is in some applications adequate, it suffers from several disadvantages. First, the use of the character set identifier adds overhead to message transmission, thereby reducing bandwidth utilization of the communication system. Additionally, if during transmission the radio message experiences interference such that a portion of the message including the character set identifier is corrupted, then identification of the language origin of the message cannot be determined and no portion of the message can be displayed.

Accordingly, a method and apparatus that overcomes the foregoing disadvantages in the prior art is desirable.

DESCRIPTION OF THE PREFERRED EMBODIMENT

Figure 1:
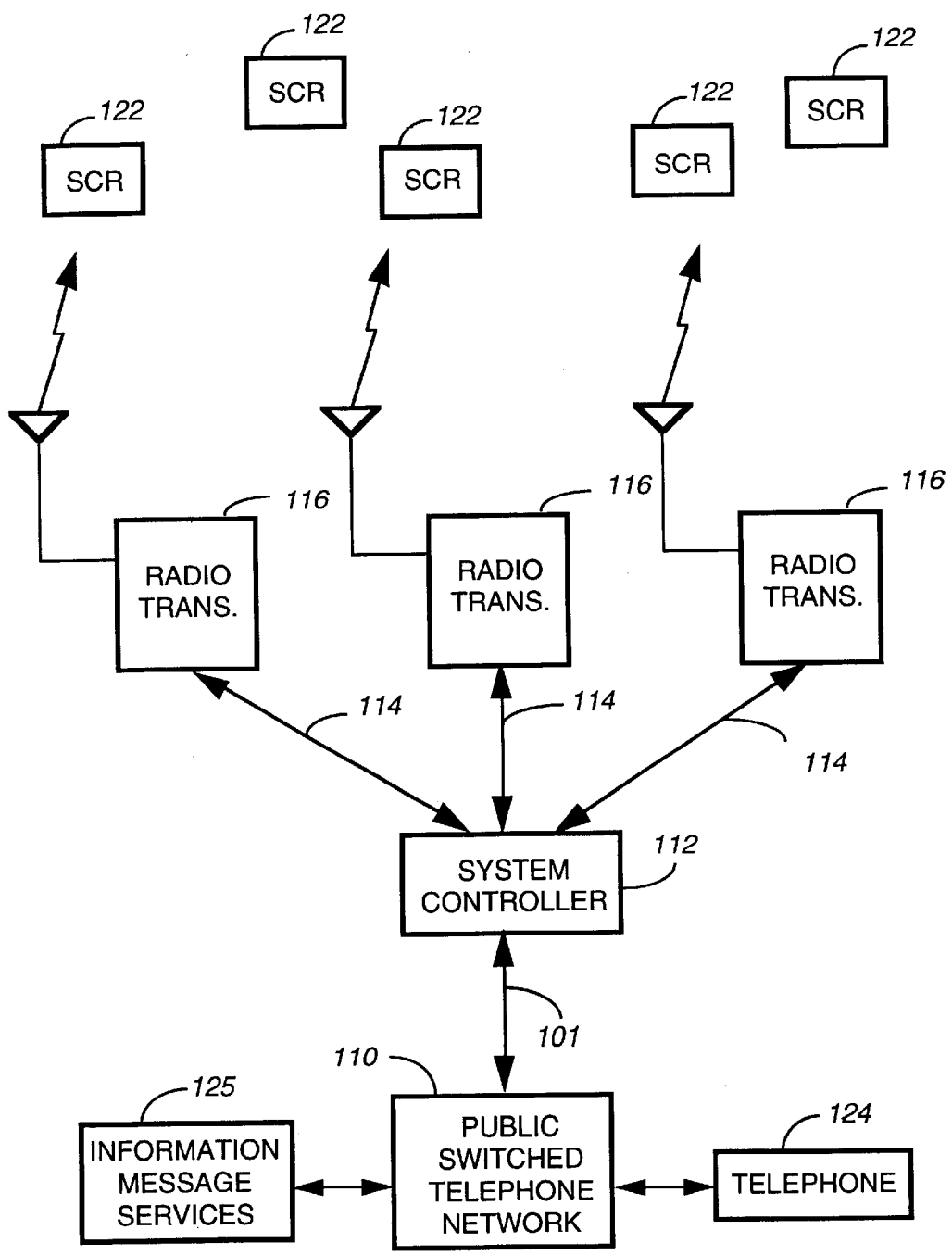
FIG. 1 shows an electrical block diagram of a radio communication system according to the present invention.

FIG. 1 shows a communication system 100 according to the present invention. The communication system 100 comprises a plurality of radio transmitters 116 for transmitting radio messages to one or more SCR's 122 (selective call receivers). The radio transmitters 116 generally receive messages from a system controller 112, which in turn receives, for example, messages from a PSTN (public switch telephone network) 110 by way of conventional communication lines 114 such as microwave links. It will be appreciated by one of ordinary skill in the art that the system controller 112 may be coupled to any number of other conventional messages sources. It will also be appreciated that, alternatively, each radio transmitter 116 may be coupled to an independent message source such as the PSTN 110.

Any one of these message sources comprises, for example, an information message services source 125 or custom communication message services source. Information message services provide subscribable information to users of SCR's 122 such as, for example, stock exchange information, news report, weather, etc. Custom communication message services allow a caller to remotely communicate messages to a user of an SCR 122 by way of, for example, a telephone unit 124 coupled to the PSTN 110.

A detailed description of a radio communication system is more fully described in U.S. Pat. No. 4,870,402 issued Sep. 26, 1989 to Deluca et al., entitled "Multilingual Paging System," which is incorporated herein by reference.

Figure 2:
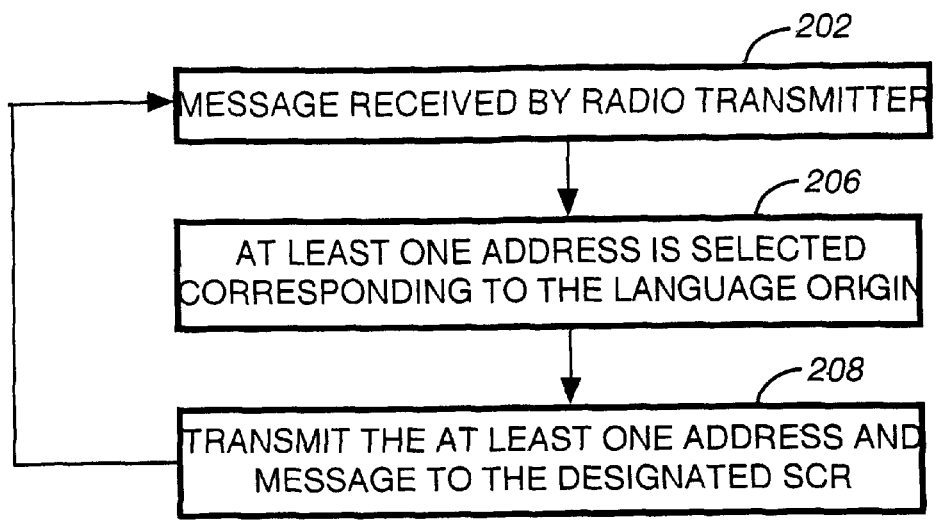
FIGS. 2 and 3 show flowcharts summarizing the process steps of a radio transmitter and a selective call receiver, respectively, according to the present invention.
Figure 3:
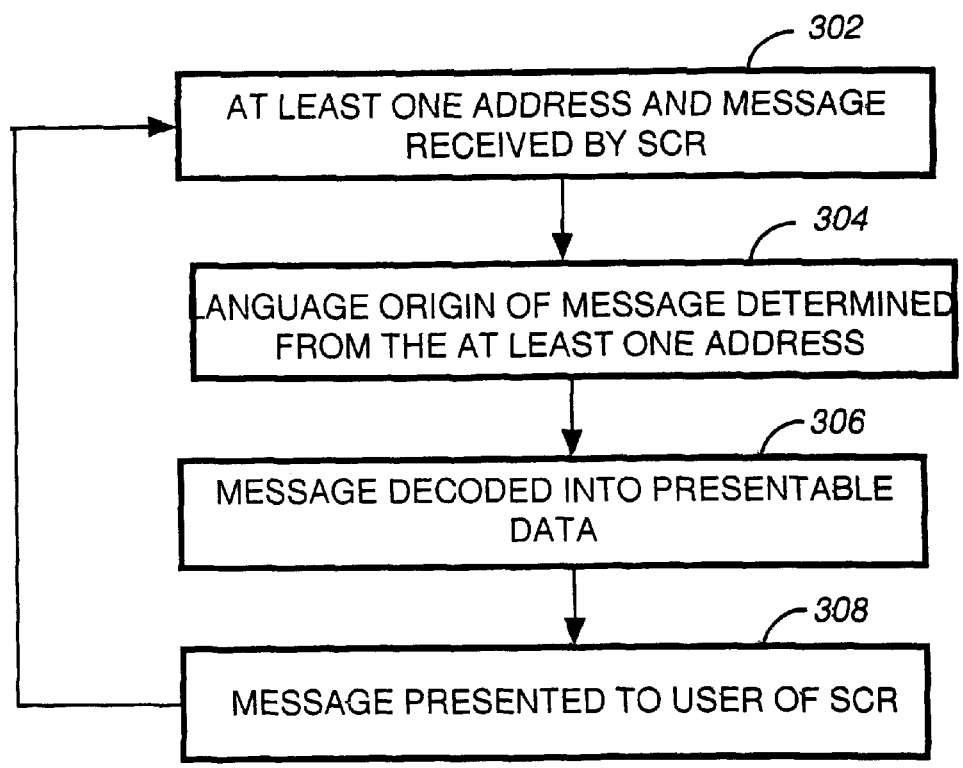

FIGS. 2 and 3 show flowcharts 200, 300 summarizing the operational steps programmed into the radio transmitter 116 and a SCR 122, respectively, according to the present invention. The programmed instructions of the radio transmitter 116 and the SCR 122 are stored in their respective memories.

The readers attention is directed to FIG. 2. Depending on the country of origin, the radio transmitter 116 receives in step 202 a message designated for at least one SCR 122 in the language of that country. As noted earlier, this message is sourced by the system controller 112 or another conventional source that provides either information services or custom communication services. Prior to transmitting a message, the radio transmitter 116 determines in step 206 the language origin of the message, which is provided, for example, by the system controller 112. The radio transmitter 116 then selects at least one address corresponding to the language origin. Thereafter, the radio transmitter transmits the at least one address and the message in step 208 to the at least one SCR 122.

Referring to FIG. 3, the at least one SCR 122 receives in step 302 the at least one address and the message transmitted by the radio transmitter 116. The SCR 122 then determines in step 304 the language origin of the message based on the at least one address, and decodes in step 306 the message into presentable data according to a bitmap corresponding to the language origin. The presentable data is then presented in step 308 to the user of the SCR 122 in the language origin of the message.

There are any number of ways in which the message may be presented to the user. For example, the presentable data may be displayed on a conventional display capable of presenting numeric or alphanumeric messages. Alternatively, the presentable data may be presented audibly. Under this embodiment, a plurality of text-to-voice synthesizers may be included in the memory 512 of the SCR 122 such, that when the language origin of a message has been determined, a corresponding voice synthesizer is selected to play out the message in a synthesized voice. It will be appreciated that additional presentation means suitable to the present invention may be used.

Tables 1 and 2 below illustrate two embodiments that use address schemes for designating language origins according to the present invention.

TABLE 1

Embodiment using Subaddresses to Identify Language Origin

| Address | Subaddress | Language | Example Display |
| --- | --- | --- | --- |
| Address A | Subaddress 1 | English | Test Message |
| | Subaddress 2 | Russian | íÂÒÚÓ,ÓÁ ÒÓÓ·˘ÂÌËÂ |
| | Subaddress 3 | Ukrainian | íÖèí èèÇÌÑèéâäÖççü |
| | Subaddress 4 | Spanish | Mensaje de Prueba |

Table 1 shows an embodiment where more than one address is utilized for designating a language origin. In this embodiment "Address A" is used as a base address to invoke one or more SCR's 122 to intercept the radio message transmitted by a radio transmitter 116. By way of example, Address A is accompanied by any one of four subaddress 1–4. Subaddress 1 identifies the message transmitted by the radio transmitter 116 as a message having a language origin of English. Subaddress 2 identifies a language origin of Russian, and so on. The column of Table 1 designated as "Example Display" shows, by way of example, how a message comprising the phrase "test message" would be displayed to a user of an SCR 122 having a presentation device 518 such as, for example, a conventional LCD display (see FIG. 5).

TABLE 2

Embodiment using Addresses to Identify Language Origin

| Address | Language | Example Display |
| --- | --- | --- |
| Address A | English | Test Message |
| Address B | Russian | íÂÒÚÓ,ÓÁ ÒÓÓ·˘ÂÌËÂ |
| Address C | Ukrainian | íÖèí èèÇÌÑèéâäÖççü |
| Address D | Spanish | Mensaje de Prueba |

Table 2 shows an embodiment of the present invention where the base address is used for invoking one or more SCR's 122 and for designating a language origin. It will be appreciated by one of ordinary skill in the art that many address hierarchies may exist, and that any one of these hierarchies which is suitable to the present invention may be used. It will also be appreciated that, alternatively, the above examples may be modified to present instead of displayable data, audible voice to a user of an SCR 122 by way of a text-to-voice synthesizer selected according to the language origin of the message.

Figure 4:
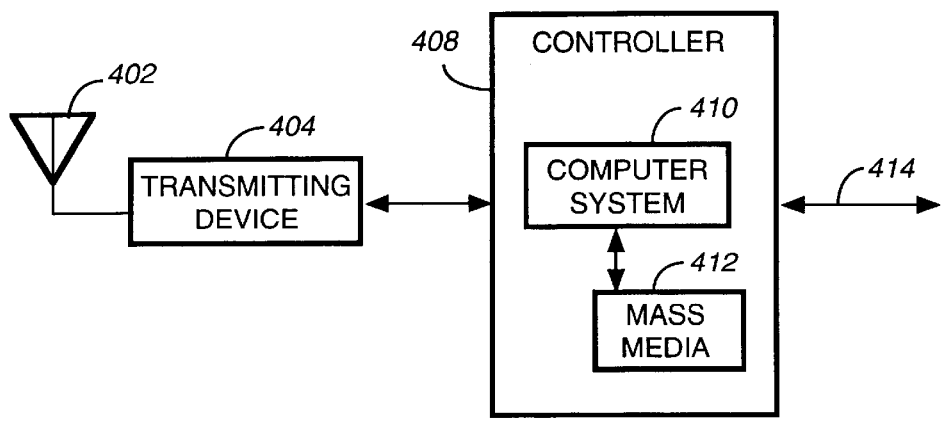
FIGS. 4 and 5 show an electrical block diagram of the radio transmitter, and the selective call receiver, respectively, according to the present invention.
Figure 5:
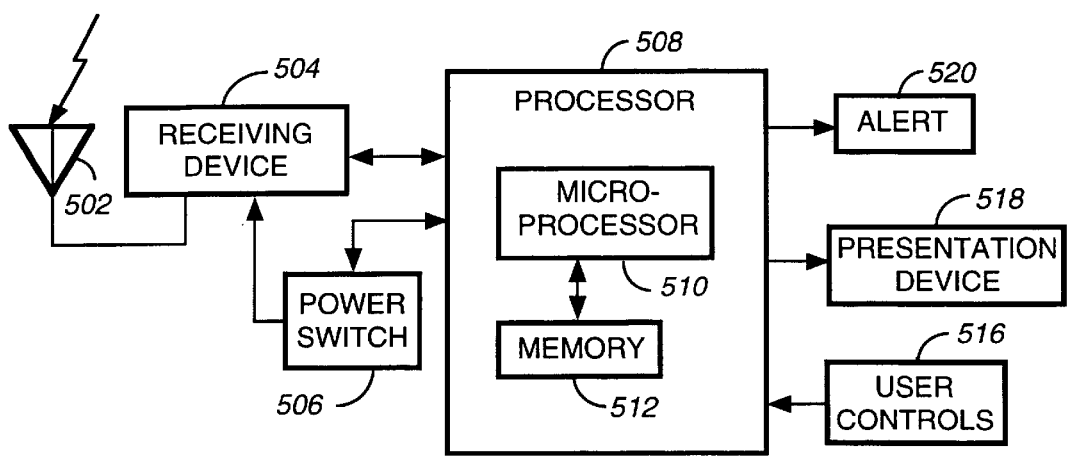

FIGS. 4 and 5 show an electrical block diagram of the radio transmitter 116 and the SCR 122, respectively, according to the present invention. The radio transmitter 116 comprises a conventional controller 408, a transmitting device 404, and an antenna 402. The controller 408 is used for controlling operation of the radio transmitter 116, and for receiving messages from the system controller 112 by way of links 414. The controller 408 includes conventional hardware such as a computer system 410 and mass media 412 to perform the programmed operations of the controller 408. The transmitting device 404 is coupled to an antenna 402, which together form a transmitter circuit for transmitting radio messages to the SCR's 122.

FIG. 5 shows an electrical block diagram of the SCR 122 according to the present invention. The SCR 122 comprises an antenna 502 for intercepting RF signals from the radio transmitter 116. The antenna 502 is coupled to a receiving device 504 employing conventional demodulation techniques for receiving communication signals transmitted by the radio transmitters 116. Radio signals received by the receiving element 504 produce demodulated information, which is coupled to a processor 508 for processing received messages. A conventional power switch 506, coupled to the processor 508, is used for controlling the supply of power to the receiving device 504, thereby providing a battery saving function.

To perform the necessary functions of the SCR 122, the processor 508 includes a microprocessor 510, and a memory 512 comprising, for example, a random access memory (RAM), a read-only memory (ROM), and an electrically erasable programmable read-only memory (EEPROM)—not shown. Preferably, the processor 508 is similar to the M68HC08 micro-controller manufactured by Motorola, Inc. It will be appreciated that other similar processors can be utilized for the processor 508, and that additional processors of the same or alternative type can be added as required to handle the processing requirements of the processor 508. It will be further appreciated that the memory 512, singly or in combination, can be manufactured as an integral portion of the microprocessor 510.

The processor 508 is programmed by way of the memory 512 to process incoming messages transmitted by the radio transmitters 116. The processor 508 decodes at least one address in the demodulated data of the received message, compares the decoded address(es) with one or more addresses stored in the memory 512 to determine whether the SCR 122 is designated as the recipient of the message, and if so, the at least one address is further decoded to determine the language origin of the message. When the SCR 122 detects that it is the recipient of the message transmitted by the radio transmitter 116, then the processor 508 proceeds in the manner described by the flowchart depicted in FIG. 3. Once the processor 508 has processed the message, it stores the message in the memory 512, and a call alerting signal is generated to alert a user that a message has been received. The call alerting signal is directed to a conventional audible or tactile alerting device 520 for generating an audible or tactile call alerting signal.

The message can be accessed by the user through user controls 514, which provide functions such as lock, unlock, delete, read, etc. More specifically, by the use of appropriate functions provided by the user controls 514, the message is recovered from the memory 512, and conveyed to the user by way of the presentation device 518. The presentation device 518 comprises, for example, a conventional LCD display and/or a conventional audio circuit for presenting audible sounds such as voice and/or music.

The present invention has several advantages over the prior art. First, by eliminating, for example, the need for a character set identifier as used by the ERMES protocol, the present invention reduces message overhead, thereby improving bandwidth utilization of the communication system. Finally, by not utilizing an additional field independent of the address field for identifying language origin, the potential for corrupting an entire message is reduced. That is, if the message is corrupted in part, but a valid address is received, the message may be displayed up to the portion of the message that is received uncorrupted.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. A method of transmitting messages to a selective call receiver, the selective call receiver designated to receive messages having at least one address of a plurality of addresses, each address of the plurality of addresses being pre-associated with one and only one language, comprising the steps of:

receiving a message from a source, the message having a corresponding language represented by a control signal included with the message;

based upon the corresponding language of the message, selecting at least one selected address of the plurality of addresses of the selective call receiver, the one selected address being pre-associated with the corresponding language of the message; and transmitting the at least one selected address and the message, without the control signal, to the selective call receiver.

2. In a selective call receiver, the selective call receiver designated to receive messages having at least one address of a plurality of addresses, each address of the plurality of addresses being pre-associated with one and only one language, the selective call receiver having a memory in which each address of the plurality of addresses is pre-associated with one and only one language, a method comprising the steps of:

receiving at least one address and a message;

determining a language of the message based solely on the at least one address; and processing the message into presentable data according to the language of the message.

3. The method as recited in claim 2, wherein the processing step comprises:

selecting a bitmap corresponding to the language of the message;

generating presentable data according to the bitmap comprising one of alphanumeric, numeric and audible data; and presenting the message according to the presentable data.

4. The method as recited in claim 2, wherein the processing step comprises:

selecting a text-to-voice synthesizer corresponding to the language of the message; and converting the message into presentable data comprising a voice message.

5. The method of claim 1 in which the selective call receiver has a memory in which each address of the plurality of addresses is pre-associated with one and only one language.

6. In a communication system comprising a radio transmitter and a selective call receiver, the selective call receiver designated to receive messages having at least one address of a plurality of addresses, each address of the plurality of addresses being pre-associated with one and only one language, a method comprising the steps of:

at the radio transmitter, receiving a message from a source, the message having a corresponding language represented by a control signal included with the message;

based upon the corresponding language of the message, selecting at least one address of the plurality of addresses of which the selective call receiver is designated to receive; and transmitting the at least one selected address and the message, without the control signal, to the selective call receiver; and at the selective call receiver, receiving the at least one selected address and the message, without the control signal; and determining the language of the message based solely on the at least one selected address.

7. The method of claim 6, including, at the selective call receiver, the additional steps of:

processing the message into presentable data according to the language; and presenting the message according to the presentable data.

8. The method as recited in claim 7, wherein the processing step comprises:

selecting a bitmap corresponding to the language; and generating presentable data according to the bitmap comprising one of alphanumeric, numeric and audible data.

9. The method as recited in claim 7, wherein the processing step comprises:

selecting a text-to-voice synthesizer corresponding to the language; and converting the message into presentable data comprising a voice message.

10. A device, comprising:

a radio transmitter for transmitting messages to a selective call receiver, the selective call receiver designated to receive messages having at least one address of a plurality of addresses, each address of the plurality of addresses being pre-associated with one and only one language; and a controller, the controller programmed to:

receive a message from a source, the message having a corresponding language represented by a control signal included with the message;

based upon the corresponding language of the message, select at least one address of the plurality of addresses of which the selective call receiver is designated to receive, the one selected address being pre-associated with the corresponding language of the message; and cause the radio transmitter to transmit the at least one selected address and the message, without the control signal, to the selective call receiver.

11. A device, comprising:
a receiver designated to receive messages having at least one address of a plurality of addresses, each address of the plurality of addresses being pre-associated with one and only one language, the device having a memory in which each address of the more than one address is pre-associated with one and only one language; and
a processor, the processor programmed to:
cause the receiver to receive at least one address and a message; and
determine a language of the message based solely on the at least one address.

12. The device as recited in claim 11, further comprising a memory, and in which the processor is further programmed to:
select a bitmap from the memory corresponding to the language; and
generate presentable data according to the bitmap comprising one of alphanumeric, numeric and audible data.

13. The device as recited in claim 11, further comprising a memory, and in which the processor is further programmed to:
select a text-to-voice synthesizer from the memory corresponding to the language; and
convert the message into presentable data comprising a voice message.

14. A communication system, comprising:
a radio transmitter for transmitting messages to a selective call receiver designated to receive messages having at least one address of a plurality of addresses, each address of the plurality of addresses being pre-associated with one and only one language, the radio transmitter including:
a controller programmed to:
receive a message from a source, the message having a corresponding language represented by a control signal included with the message;
based upon the corresponding language of the message, select at least one address of the plurality of addresses of the selective call receiver; and
cause the transmitting device to transmit the at least one selected address of the plurality of addresses and the message, without the control signal, to the selective call receiver, the selective call receiver including:
a processor programmed to:
cause the receiving device to receive the at least one selected address and the message transmitted by the radio transmitter; and
determine the language of the message based solely on the at least one selected address.

* * * * *